B. R. JOLLY.
SPECIFIC GRAVITY BALANCE.
APPLICATION FILED AUG. 27, 1908.
945,329.
Patented Jan. 4, 1910.
3 SHEETS—SHEET 2.
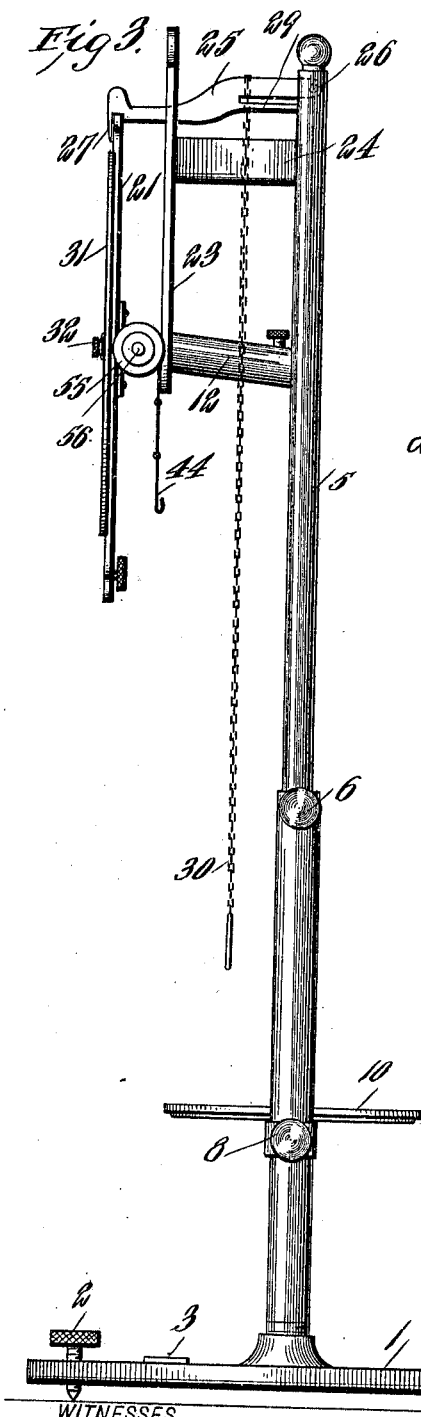
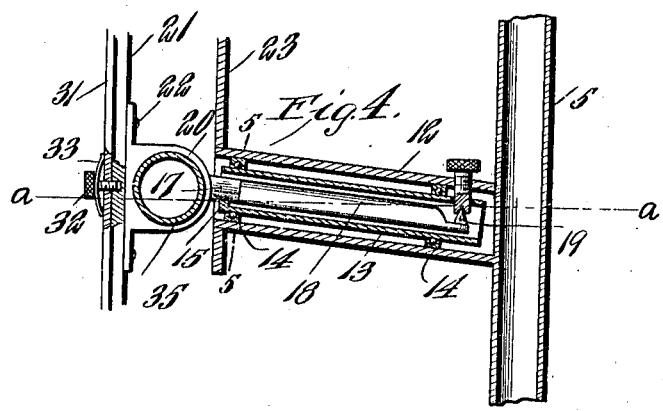
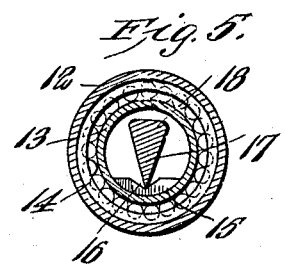
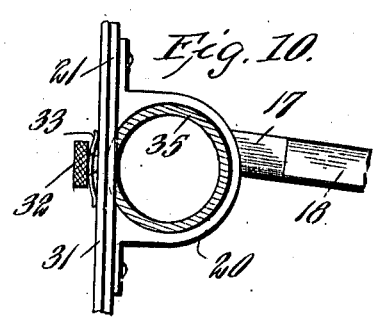
WITNESSES
INVENTOR
BENJAMIN R. JOLLY
BY
ATTORNEYS B. R. JOLLY.
SPECIFIC GRAVITY BALANCE.
APPLICATION FILED AUG. 27, 1908.
945,329.
Patented Jan. 4, 1910.
3 SHEETS—SHEET 3.
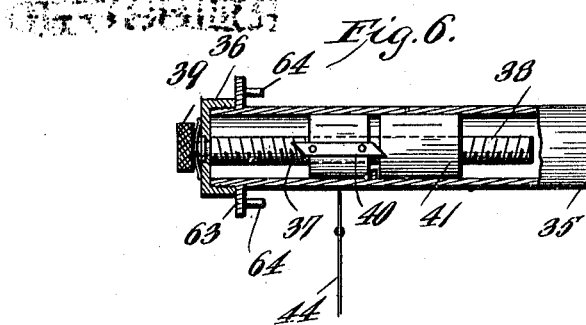
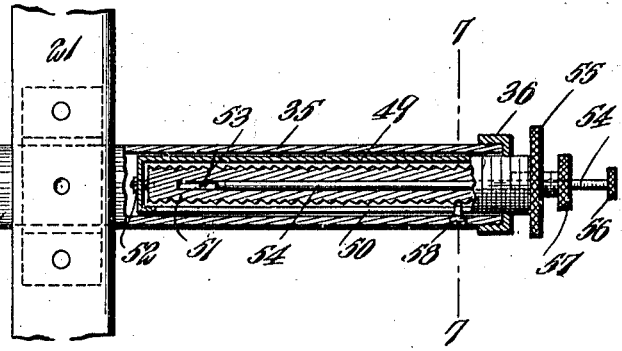
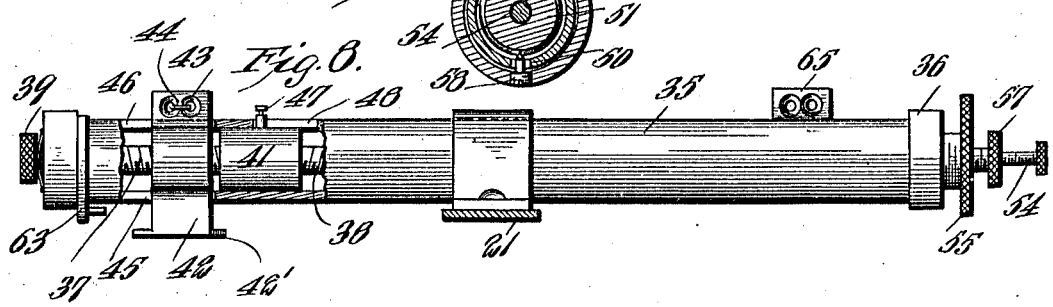
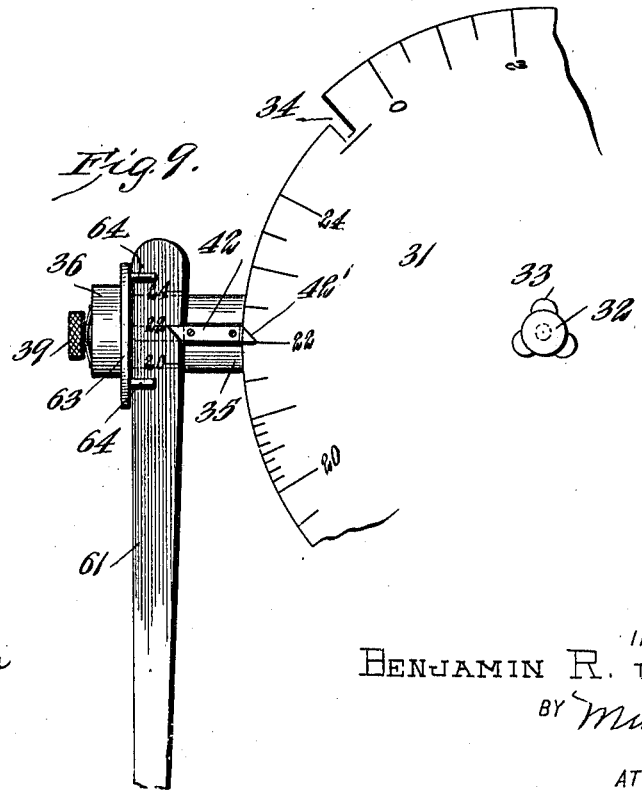
WITNESSES
INVENTOR
BENJAMIN R. JOLLY
BY
ATTORNEYS

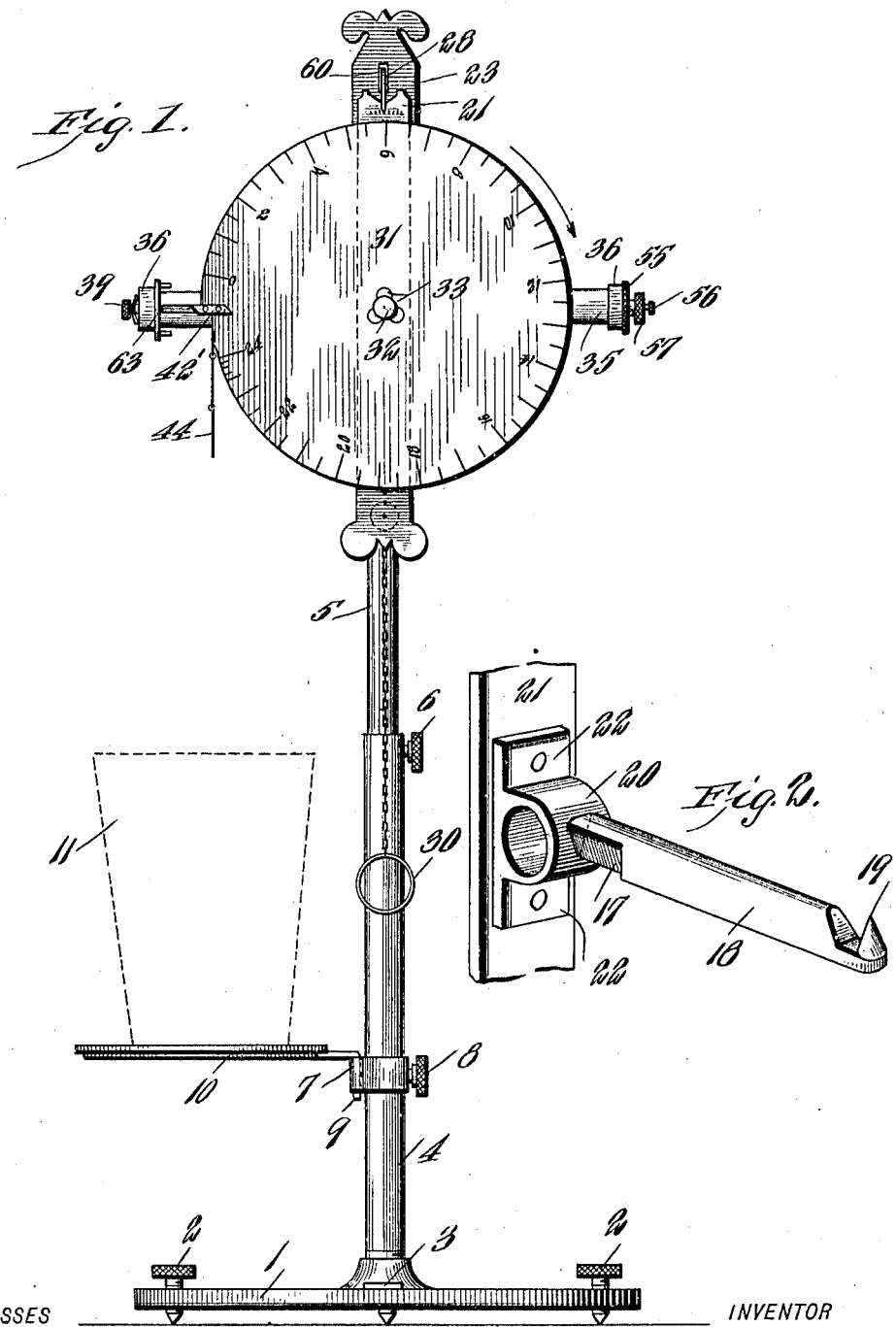

UNITED STATES PATENT OFFICE.

BENJAMIN R. JOLLY, OF RALEIGH, NORTH CAROLINA.

SPECIFIC-GRAVITY BALANCE.

945,329.           Specification of Letters Patent.      Patented Jan. 4, 1910.

Application filed August 27, 1908. Serial No. 450,556.    REISSUED

*To all whom it may concern:*

Be it known that I, BENJAMIN RUSH JOLLY, a citizen of the United States, and a resident of Raleigh, in the county of Wake and State of North Carolina, have made certain new and useful Improvements in Specific-Gravity Balances, of which the following is a specification.

My invention relates to improvements in indicating balances and it consists of the combinations, constructions and arrangements hereinafter described and claimed.

An object of my invention is to provide a balance, by means of which jewelers and others employing gold or other precious metals of the manufacturing arts, may ascertain approximately the fineness of the gold without resorting to the usual means, which are troublesome and require expensive instruments.

In carrying out my invention I provide a scale by which the object to be assayed may be first balanced in air and then balanced in water by moving the weight farther from the pivot or center of the balance beam. The quality or fineness of the substance may then be determined immediately by means of a scale which is rotated until it reaches a stop, when the reading may be taken directly.

My invention is illustrated in the accompanying drawings, in which—

Figure 1 is a front view of my improved balance. Fig. 2 is an enlarged detail view of the knife edge and the pivot point for supporting the beam. Fig. 3 is a side view of the balance. Fig. 4 is an enlarged detail view of the suspending means. Fig. 5 is a sectional view along the line 5—5 of Fig. 4. Fig. 6 is a view partly in section of the beam. Fig. 7 is a section of the beam along the line 7—7 of Fig. 6. Fig. 8 is a plan view of the beam. Fig. 9 is an enlarged detail view showing the manner in which the readings are taken, and Fig. 10 is a sectional view showing a modified means of mounting the upright strip.

Referring now to Fig. 1, I have shown therein a circular base 1 provided with leveling screws 2, and a cylindrical spirit level 3 of the ordinary type used on balances. Carried by the base 1 is a hollow cylindrical standard 4, within which the rod 5 is arranged to enter, the latter being adjustably secured therein by means of the set screw 6. A collar 7, provided with a similar set screw 8, is perforated to receive the downwardly extending arm 9 of the support 10. The latter may carry a cup 11, or any vessel adapted to hold water.

Referring now to Fig. 3, it will be seen that toward the upper part of the rod is a laterally extending and upwardly inclined cylinder 12. The cylinder 12 may be secured to the rod 5 in any suitable manner, but is preferably brazed thereto. Within the cylinder 12 is a smaller cylinder 13, which is carried upon ball bearings 14, arranged between the surfaces of the two cylinders, as clearly shown in Figs. 4 and 5. The front end of the cylinder 13 is provided with an upturned flange 15, having a slot 16 therein arranged to receive the knife edge 17. The knife edge 17 is on the lower edge of one end of a rod 18, while on the opposite end of the rod there is a cone-shaped pivot 19. The line $a$—$a$, in Fig. 4, drawn through the top of the pivot 19 and the bottom of the knife edge 17, represents the pivotal line of the scale beam. The end of the rod 18 constituting the knife edge, is secured to a collar 20, which is in turn fastened to a strip 21 by means of the flanges 22. The outer end of the cylinder 12 passes through an opening in an upright plate 23, being flush with the outer surface thereof, as shown in Fig. 4. The upper end of this plate is secured by a brace 24 to the rod 5. A laterally extending arm 25 is pivoted in a slot in the rod 5 at 26 and is provided with an indicating pointer 27 on the front end. The arm 25 passes through a slot 28 in the upright plate 23, and the pointer 27 is arranged to indicate a balance of the strip 21 when the 0 of the scale on the strip coincides with the pointer. The arm 25 is held in an upright position by means of a spring 29, formed by cutting the rear end of the arm in the manner shown in Fig. 3, and permitting the spring member to rest on the bottom of the slot so that when the arm is pulled downwardly by means of the chain 30, it will be put under tension and will be restored to its original position through the reaction of the spring 29. A disk 31, whose periphery has the shape of an involute curve, and which is divided up into twenty-four integral parts and fractions thereof, as clearly shown in Fig. 1, is fastened to the strip 21 by means of the screw 32, which holds the disk 31 in close proximity to the strip by means of the tripod spring 33, as clearly shown in Fig. 4. In the edge of the disk on one side thereof, there is a slot 34, the purpose of which will be hereinafter explained.

The construction of the balance beam is shown in Figs. 6, 7 and 8. It consists of an outer cylinder 35, having threaded ends and provided with the end cap 36. The cylinder 35 is arranged to pass through the collar 20 and to be held thereby. The left hand side of the beam is arranged to support the article to be weighed.

Referring now particularly to Figs. 6 and 8, it will be seen that the interior of the hollow cylinder 35 is provided with a centrally disposed screw shaft, the outer portion 37 of said shaft constituting a right handed screw, while the inner portion 38 has oppositely inclined threads and constitutes a left handed screw. The screw shaft is provided with a reduced end, which is journaled in the cap 36 and has a milled thumb nut 39 for turning the same.

Disposed on the left and right hand portions of the screw shaft are the movable weights 40 and 41. The weight 40 is provided with opposite laterally extending portions 42 and 43, the former constituting an indicating member or pointer, and the latter providing a knife-edge bearing for a suspending chain 44. As clearly shown in Fig. 8, this knife edge bearing is formed by reaming out two holes in the portion 43, in such a manner that the outer reamed portions of the holes overlap, thereby providing a piece of metal having a comparatively small angle between the two holes, which constitutes an admirable knife edge. The extensions 42 and 43 are arranged to pass through slots 45 and 46 respectively, on opposite sides of the cylinder 35. The weight 41 is provided with a laterally extending pin 47, which extends through a slot 48 in the cylinder 35. Both of the weights 40 and 41 are threaded internally, so that when the thumb wheel 39 is turned, these weights are forced apart or brought together by the action of the screw, in the meanwhile being prevented from turning with the screw by means of the lateral extensions which pass through the slots in the beam as heretofore explained. The object of this arrangement is to provide means for shifting the position of the article to be balanced by means of moving parts without increasing the moment of rotation in any way by the movement of said parts. To this end the weight 40, together with its lateral extensions and the member 44, is exactly equal in weight to the member 41. The opposite end of the beam is provided with an internal cylinder 49, and has a longitudinal slot 50 on its under side. Within the cylinder 49 is a threaded rod 51. The latter is pivotally secured at one end to the cylinder 49, by means of the pivot screw 52, as clearly shown in Fig. 6. While I have designated this member as a rod, it will be understood that a threaded cylinder might be used in lieu thereof. The rod 51 is provided with a central slot 53 arranged to receive a smaller rod 54. The cylinder 49 and the rod 54 are each provided with indicating scales on their outer surfaces, the former being graduated preferably in pennyweights and the latter in grains, although obviously the indicating characters may be so spaced as to represent other weights than these mentioned. The rods 51 and 54 are provided with milled end flanges 55 and 56, respectively. The rod 54 is arranged to pass through a hollow screw 57, which is arranged to extend into one end of the rod 51, and which can be screwed into or out of a slot in said rod for purposes of accurate adjustment of the balance beam.

Toward the outer end of the cylinder 35 is a screw 58, which has a threaded bearing in the cylinder 35 and passes through the slot 50 in the cylinder 49. The inner end of the screw engages the threads of the rod 51, as shown in Figs. 6 and 7.

The above described arrangement of the right hand end of the beam provides a novel means for extending the telescopic sections. It will be seen that by the revolution of the thumb flange 55, which is integral with the rod 51, as before stated, the latter will be turned, and since the screw 58 is stationary, the rod 51 and the cylinder 49, through its pivotal connection with the rod, will be forced outwardly, but while the rod is being rotated, the cylinder, which has upon it the indicating scale, will not be rotated, but will be forced outwardly by the rod as the flange 55 is turned. By this arrangement I secure the positive and accurate movement of the telescoping members and at the same time the indicating scale is always in view.

The foregoing description of the various parts of the device will be sufficient for a thorough understanding of its operation, which is as follows. Let us assume that a jeweler has an object, such as a gold ring, the composition of which he is in doubt. He first adjusts the balance by turning the screw 57, until with no weight on the pan, the pointer indicates 0 on the scale. He then attaches the ring by means of a fine thread to the chain 44, the parts of the balance being in the position shown in Fig. 1. Thereupon the left hand side of the beam is deflected downwardly due to the weight of the article. In order to obtain a balance he turns the thumb flange or wheel 55 until the inner cylinder has been extended far enough outwardly, so that a balance is obtained. In obtaining this balance he pulls down on the chain 30 when placing on the weight or adjusting the balancing arms, and as he does so, the arm 25 engages the triangular slot 60 at the top of the strip 21, thereby steadying the balance and preventing any lateral movement. When he wishes to try for a balance, he releases the chain, and the arm 25 is returned to its original position by the spring 29. By careful adjustment a balance is obtained. A vessel of water is now placed on the stand 10 and the same article is balanced in water, by shifting the article further out on the supporting end of the beam. This is accomplished by turning the thumb wheel 39 and as heretofore explained, the compensating weights 40 and 41 move to left and right respectively, the former carrying the suspended article out toward the free end of the supporting side of the beam. In the meanwhile, the right hand end of the beam is left undisturbed. When the balance is obtained the disk 31 is rotated in the direction indicated by the arrow in Fig. 1. This is made possible because while in its initial position, the indicating bar 42' on the extension 42, was in the slot of the disk, that is, when the article was balanced in air. It was moved out of the slot to a position toward the end of the beam when the article was balanced in water. The disk is rotated as before stated and during its rotation its edge, which is an involute curve, comes constantly nearer the extension 42 until it finally reaches it, when the indicating member 42' will coincide with a figure on the disk, which will represent the value of the gold in carats. Fig. 9 shows the position of the disk after the apparatus has been used to determine the composition of the mass of gold assaying twenty-two carats.

The theory upon which my device works is as follows. Let the weight of the gold be W and the perpendicular distance of its line of suspension from the center of the balance be P, then W times P equals the turning moment which must be opposed by a similar turning moment on the opposite side of the balance which we will designate by X. Now when the article is balanced in water the buoyant force of the water tends to decrease the turning moment of the left hand side of the scale and to obtain a balance now we must move the article out so that the turning moment is now P plus $p$. The scale 31 is arbitrarily marked with the figure 24, which represents the point to which the scale must be turned in order to come in contact and be stopped by the extension 42, when pure gold is being tested. The other figures on the scale represent carats, and these indicating marks are easily made by calibrating the scale with alloys of known composition. Having a given starting point for the extension 42, against which the disk rests and a movement $p$ to balance a given weight, it will be clear that with a movement $2p$ the disk will have to be turned twice as far and hence would indicate an article of less weight and therefore of less value.

In Fig. 9 I have shown an additional means by which the fineness of the metal can be read directly and which can be used as a check on the reading indicated by the disk. This is a graduated scale 61, which may be placed between a guide member 63, having guide pins 64, and the extension 42. This scale 61 has a straight side and an inclined side, and is provided with graduations representing carats. As the extension 42 nears the guide member 63, less space is left for the scale 61, so that by slipping the scale down and letting it rest when it comes in contact with the extension 42, the indicating member 42' will indicate approximately the value of the metal in carats.

In using my scale for purposes of determining specific gravity, it is only necessary to provide a disk calibrated with the proper numerals, and this may be done in precisely the same way as before by taking two or more substances of known specific gravity, balancing them in air and in water and in marking on the disk their appropriate numbers and subdividing the disk accordingly.

It will be seen that I have provided a device in which the fineness of the precious metals in common use can be quickly and accurately determined without the necessity of making a chemical analysis of the composition of the metal, or of resorting to expensive balances of delicate construction. Furthermore, my balance can be converted at once into an ordinary jeweler's balance by attaching a chain to the knife edge of the lateral extension 65 of the cylinder 35 and suspending pans thereto. By means of the scales on the cylinder 49 and rod 54, the balance may be used as indicating scales without the necessity of the use of separate weights.

I am aware that various modifications of the device, based upon the same general idea, might be made, but I regard as my own and wish to claim, all such modifications as fairly fall within the spirit and the scope of the invention.

In Fig. 10 I have shown a modified means for mounting the upright strip 21. In this figure the beam is shown cut away so as to bring the face of the strip 21 in the same plane with the edge of the beam 35, thereby providing bearing points for the disk and preventing the lateral movement of the same on its pivot.

I claim—

1. In a balance, a hollow pivoted beam, suspending and compensating means located therein and slidable therealong, a screw shaft within said beam for simultaneously moving said suspending means and said compensating means, and movable means adapted to engage the suspending means for indicating the extent of movement of the latter.

2. In a balance, a hollow pivoted beam, a screw shaft carried by said beam provided with right handed and left handed threads, a suspending member carried in said hollow beam arranged to be actuated by said right handed threads, a compensating weight arranged to be actuated by said left handed threads, and a rotatable disk arranged to engage the suspending means in its shifted position for indicating the extent of movement of said suspending means.

3. In a balance, a hollow pivoted beam, movable compensating means disposed within said pivoted beam telescoping members secured in one end of said beam, one of said members being provided with a thumb flange and means for moving said telescoping members simultaneously by the rotation of said thumb flange.

4. In a balance, a hollow pivoted beam, a cylinder arranged to enter one end of said hollow beam, a threaded rod within said cylinder and connected with the latter at one end and having a thumb flange, means arranged to engage said rod to cause a progressive movement of the rod and cylinder when the thumb flange is turned.

5. In a balance, a hollow pivoted beam, a slotted cylinder adapted to slide in and out of said beam, a threaded rod disposed in said cylinder and pivotally connected with the latter at one end, and a screw arranged to pass through the slot of said cylinder to engage the threads of said rod, whereby when the latter is rotated the cylinder will be moved outwardly without rotation.

6. In a balance, a base, an upright therefor, an inclined cylinder secured to said upright, and a balance beam disposed within said cylinder and provided with a knife edge, and a pivot point for retaining said knife edge in position.

7. In a balance, a base, an upright therefor, an inclined cylinder secured to said upright, and a balance beam having a lateral extension provided on the under side thereof with a knife edge and on the upper side with a pivot point, and arranged to enter and be supported within said inclined cylinder.

8. In a balance, a base, an upright therefor, an inclined cylinder secured to said upright, a second cylinder secured within said inclined cylinder, ball bearings therefor, and a balance beam having a lateral extension provided on the under side thereof with a knife edge and on the upper side with a pivot point, and arranged to enter and be supported by said ball bearing cylinder.

9. In a balance, a pivoted beam provided with suspending and compensating members on one end thereof and movable therealong means including a thumb wheel on the end of said beam, for simultaneously moving said compensating and said suspending means, telescoping members on the other end of said beam, a thumb wheel on one of said telescoping members for providing an outward non-rotary movement of the other of said members, and an indicating disk arranged to be rotated into engagement with said suspending means in its adjusted position.

10. In a balance, a pivoted beam, a disk carried thereby, suspending and compensating means disposed on said beam, and movable therealong means including a thumb wheel on the end of said beam for simultaneously moving said suspending and said compensating means, and means on the surface of the disk for indicating the relative movement of the suspending means.

11. In a balance, a pivoted beam, a movable suspending member carried by said beam, and a disk having a periphery in the form of an involute curve arranged to contact with the suspending member in its original position and to be turned to contact with it in its shifted position, thereby indicating the relative movement of the suspending member.

12. In a balance, a pivoted beam provided with suspending and compensating members on one end thereof, and counterweights on the other end, said parts providing means for balancing a suspended object, a pivoted disk, means for moving the suspending member toward and away from the edge of the disk said disk being provided with a scale on the disk for denoting the relative movement of the suspending member.

BENJAMIN R. JOLLY.

Witnesses:
SOLON C. KEMON,
LESTER A. STANLEY.